Aug. 30, 1932.  J. E. BROWN  1,874,883
FISH LURE
Filed Aug. 19, 1929
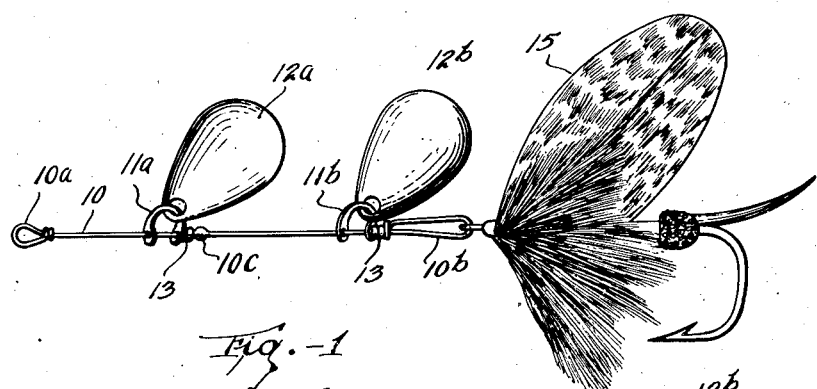
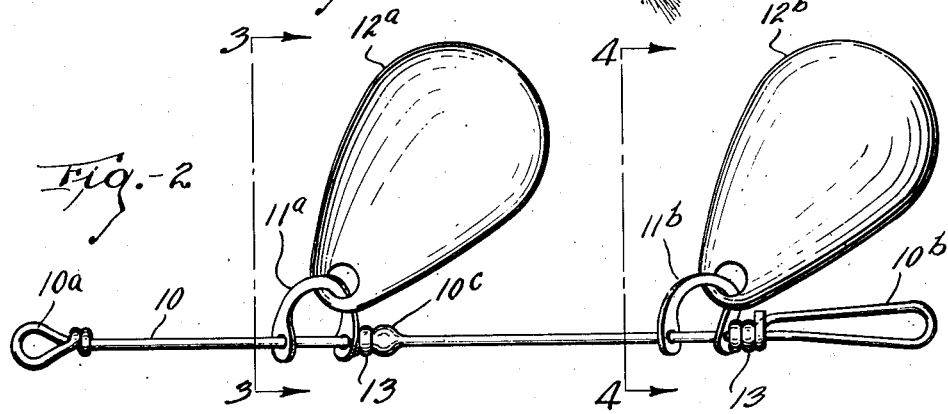
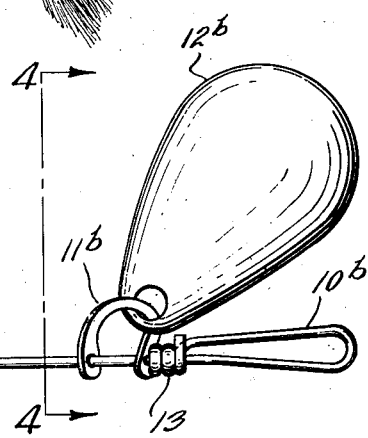
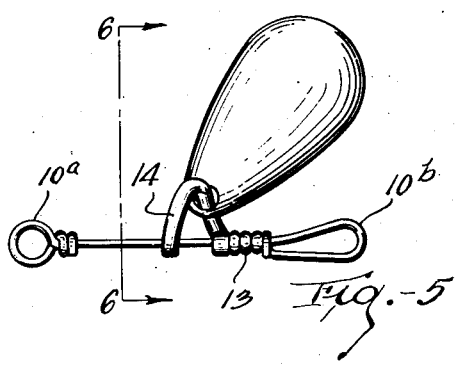
INVENTOR
JOHN EMMETT BROWN.
BY
Ely & Barrow
ATTORNEYS Patented Aug. 30, 1932

1,874,883

UNITED STATES PATENT OFFICE

JOHN EMMETT BROWN, OF ELYRIA, OHIO, ASSIGNOR TO THE ENTERPRISE MANUFACTURING COMPANY, OF AKRON, OHIO, A CORPORATION OF OHIO

FISH LURE

Application filed August 19, 1929. Serial No. 386,859.

This invention relates to fish lures of the type employing revolving spoons or spinners.

The invention more particularly relates to the method of mounting revolving spoons on shafts or the like used in the construction of fish lures.

An object of the invention is to accurately control the direction of rotation of spoons on their supporting wire by constructing the loops or clips on which the spoon is carried in the distinctive manner shown and described.

A further object is to provide a double spoon on a wire shaft wherein the spoons revolve in opposite directions by combining the elements to set up rotation in opposite directions.

It is to be understood that the invention is not limited to the embodiment described below and shown in the accompanying drawing.

Of the accompanying drawing,

Figure 1 is a side elevation of a spoon embodying the invention showing it attached to a lure;

Figure 2 is a side elevation of a double spoon;

Figure 3 is a view on line 3—3 of Figure 2;

Figure 4 is a view on line 4—4 of Figure 2;

Figure 5 is a side elevation of a single spoon embodying a slightly modified form of the invention; and Figure 6 is a view on line 6—6 of Figure 5.

A spring wire shaft or leader 10 having an eye 10$^a$, a snap loop 10$^b$ and a raised knob 10$^c$ is adapted to carry helically formed rotatable clips or loops 11$^a$ and 11$^b$ which in turn carry spoons 12$^a$ and 12$^b$. Beads 13 are provided to take the end thrust and reduce the turning friction of the loops as is common in the art.

The invention lies primarily in the form of the loops 11 and in the attachment of the spoons thereto. The loops in Figures 1 to 4 are formed in helical or spiral shape from sheet material, the ends of the loop being journaled as shown on the wire 10. The helical form of the loops is such that the outer portion of the loop is at an angle of 45° or greater with the wire. This means that as the spoon is thrown outwardly of the shaft by the centrifugal action, or by its contact with the water, the body of the spoon will tilt or cock against the outer portion of the loop or clip, and as that portion of the clip is at an angle to the shaft, a tendency will be set up for the spoon to rotate in one direction. The spoon, being held at this angle will be caused to rotate in the desired direction, depending upon the direction in which the loop is spiralled. As will be seen from Figures 2, 3, and 4, when a reverse rotation of the spoons is desired, the loops are formed oppositely of each other, that is, one is right handed and one left. Thus the concave portions of the spoons are caused to lie or face on opposite sides and the spoons when depending freely from the loops are at right angles to each other. For the reasons given, the spoons are caused to revolve in opposite directions.

As shown by Figure 5, the invention can be employed on single spoons to equal advantage. This figure also shows at 14 a modified form of the loop. This loop is not made from flat metal but from solid wire bent in helical form. The wire holds the spoon in the same position as the flat loop.

As shown in Figure 1, the spoons either singly or in pairs are generally employed in conjunction with a lure, hook or the like 15. The snap loop 10$^b$ assists in interchanging the different lures.

It will be apparent that the invention is capable of application in other than the specific form shown and described herein. Accordingly, various modifications of the invention can be resorted to without departing from the spirit of the invention and the scope of the subjoined claims.

What is claimed is:

1. In combination, a shaft, a helical loop journaled at its ends on said shaft, and a spoon carried by said loop.

2. In combination, a wire formed with a snap loop at one end and an eye at the other, a helical loop having its ends in alignment and journaled at its ends on said wire, said helical loop being formed of flat metal, and a spoon carried by the helical loop, said loop positioning the spoon and governing the rotation thereof.

3. In a fish lure, a shaft, a plain spoon and means for supporting the spoon on the shaft, said means operating to position the spoon to cause the spoon to turn in determinate direction laterally when the spoon unit is drawn through the water.

4. In a fish spoon unit, a leader wire, a pair of identical spoons and means for rotatably supporting the spoons on the wire, said means causing the spoons to rotate in opposite directions.

5. In a fish spoon unit, a leader wire, a pair of spoons and means comprising opposite handed helical loops journaled at their ends on the wire for rotatably supporting the spoons on the wire, said means positioning said spoons to cause the spoons to rotate in opposite directions.

6. In combination, a shaft, a pair of spoons thereon and means for causing the spoons to rotate in opposite directions when the unit is drawn through the water, said means comprising clips having spiral surfaces thereon, the spiral surface of one clip being reversed with relation to the spiral surface of the other clip the spoons being located at the said spiral surfaces and caused thereby to assume opposite angular positions with relation to the shaft.

7. In combination, a shaft, a rotatable clip thereon, and a spoon loosely supported by the clip, the contour of the clip determining the angular position of the spoon and the direction of its rotation about the shaft.

JOHN EMMETT BROWN.